United States Patent [19]

Best et al.

[11] Patent Number: 5,456,347
[45] Date of Patent: Oct. 10, 1995

[54] CONTROLLABLY POWERED ROLLER CONVEYORS

[75] Inventors: John W. Best; Bobby K. Flippo; Paul W. Irby, all of Jonesboro, Ark.

[73] Assignee: Northstar Industries, Inc., Jonesboro, Ark.

[21] Appl. No.: 341,462

[22] Filed: Nov. 17, 1994

Related U.S. Application Data

[63] Continuation of Ser. No. 22,012, Feb. 24, 1993, abandoned.

[51] Int. Cl.$^6$ ................................. B65G 13/06
[52] U.S. Cl. ................ 198/781.06; 198/782; 198/788; 198/502.2; 193/35 TE
[58] Field of Search ................................. 198/781, 782, 198/788, 502.2; 193/35 TE

[56] References Cited

U.S. PATENT DOCUMENTS

| | | | |
|---|---|---|---|
| 1,725,740 | 8/1929 | Schulte | 198/788 |
| 2,915,167 | 12/1959 | Berger | 198/788 |
| 3,242,342 | 3/1966 | Gabar | 198/502.2 |
| 4,852,712 | 8/1989 | Best | 193/35 TE |
| 5,042,644 | 8/1991 | Davis | 198/781 |
| 5,060,785 | 10/1991 | Garrity | 198/781 |
| 5,147,025 | 9/1992 | Flippo | 198/782 |
| 5,224,584 | 7/1993 | Best et al. | 198/782 |

FOREIGN PATENT DOCUMENTS 4107  1/1987  Japan ..................... 193/35 TE

*Primary Examiner*—Joseph E. Valenza
*Attorney, Agent, or Firm*—James L. Ewing, IV; Mitchell G. Stockwell; Kilpatrick & Cody

[57] ABSTRACT

Conveyors containing powered rollers arranged in zones, each of which zones may be independently controlled. Such conveyors are particularly useful in transitioning object flow from a constant speed conveyor such as in a plant or warehouse, to manual offloading operations which tends to be more intermittent in nature. The independently controlled zones automatically activate and deactivate in a manner that allows objects to accumulate in a compact fashion on the conveyor when offloading operations stop, but once again to space themselves apart from one another as offloading operations resume and flow once again reaches steady state. This increased spacing during steady state flow allows the conveyor to begin absorbing objects in the accumulation mode if and when offloading stops again. Among other beneficial effects is an ergonomic one: Workers are freed from the stress of knowing that objects flowing on the conveyor will simply be propelled off the end if they take a momentary break.

19 Claims, 12 Drawing Sheets

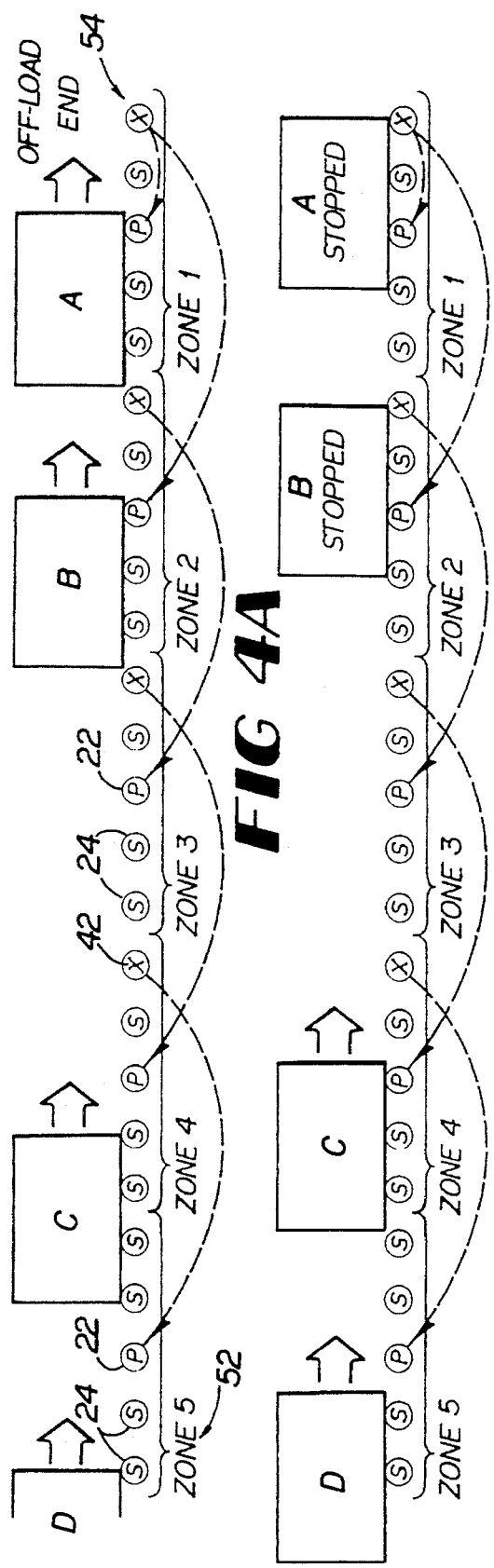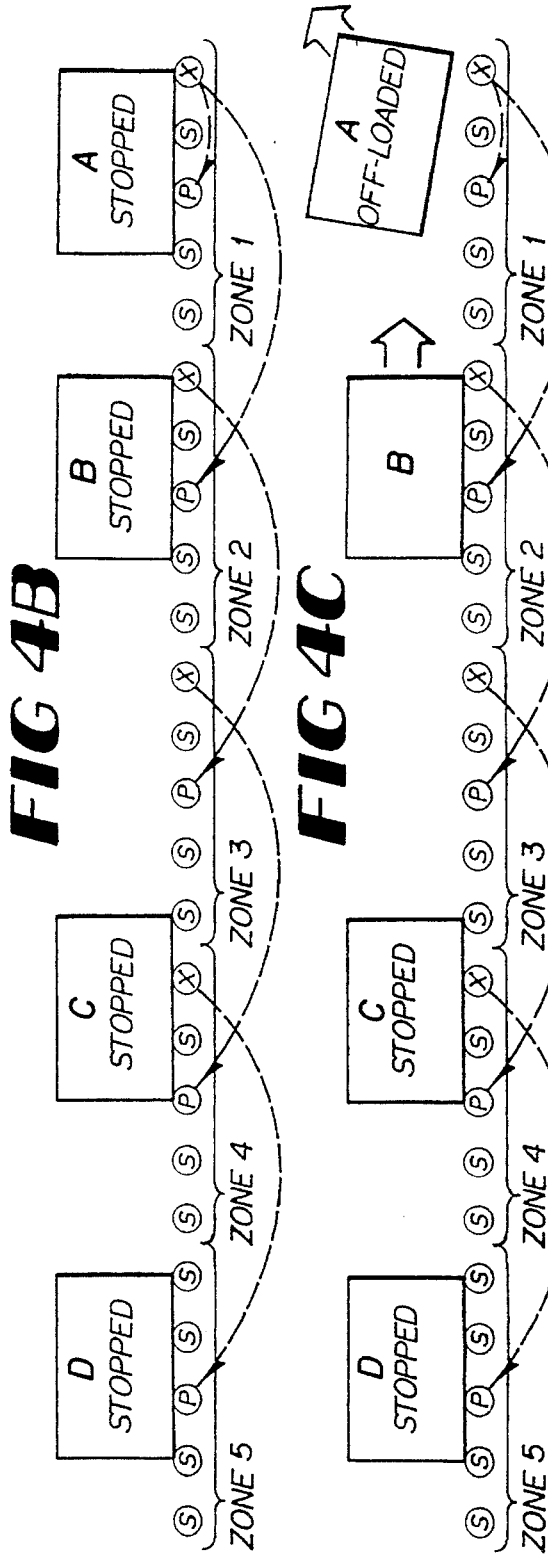

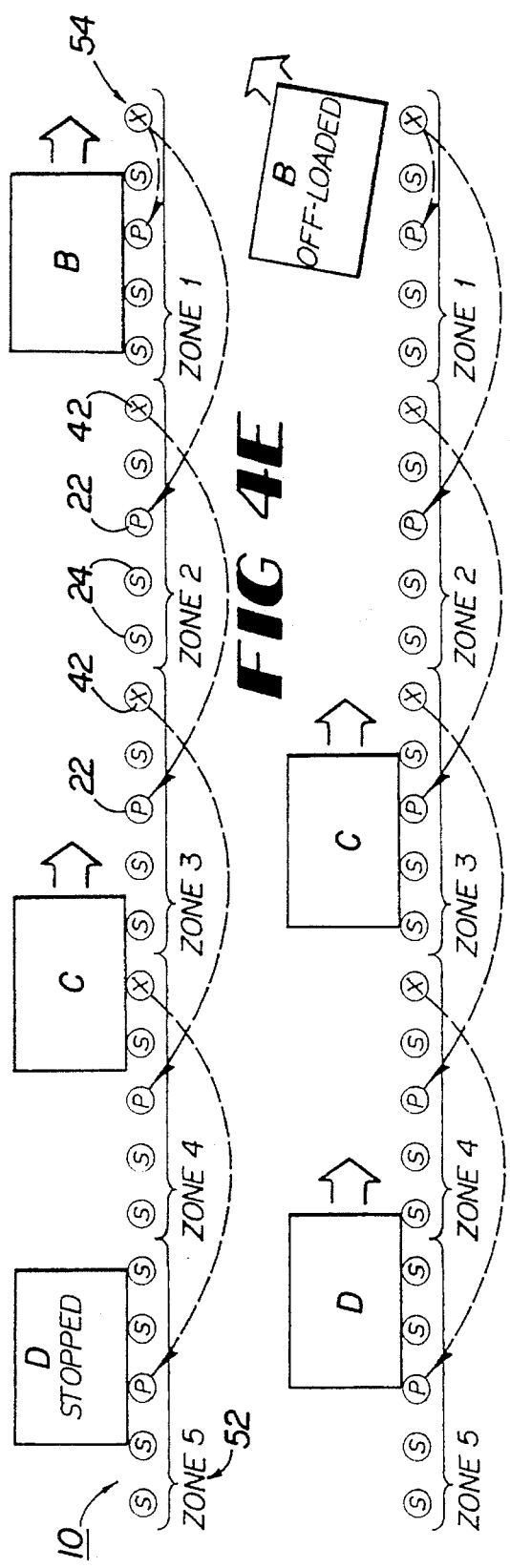
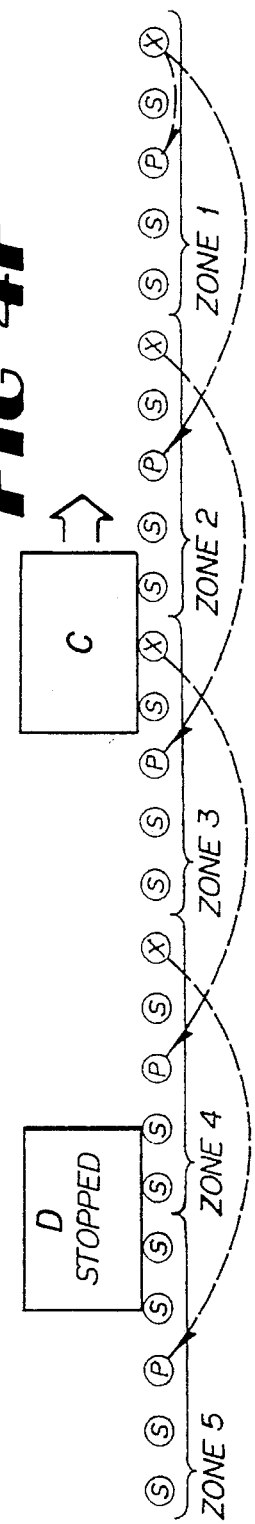
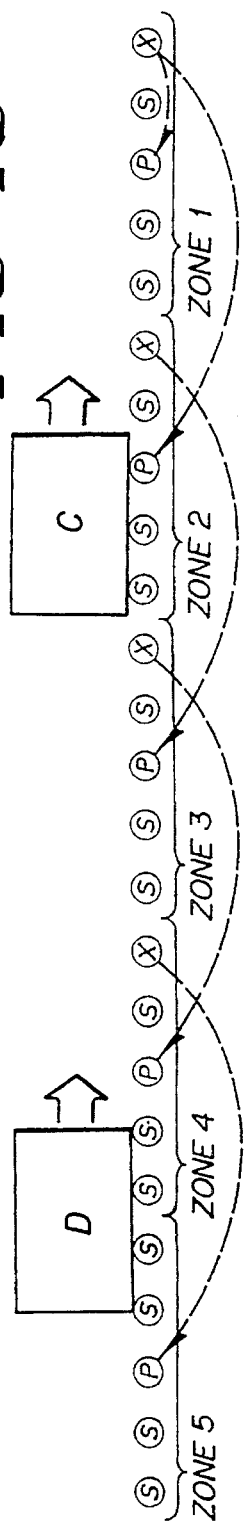
FIG 4E  FIG 4F  FIG 4G  FIG 4H

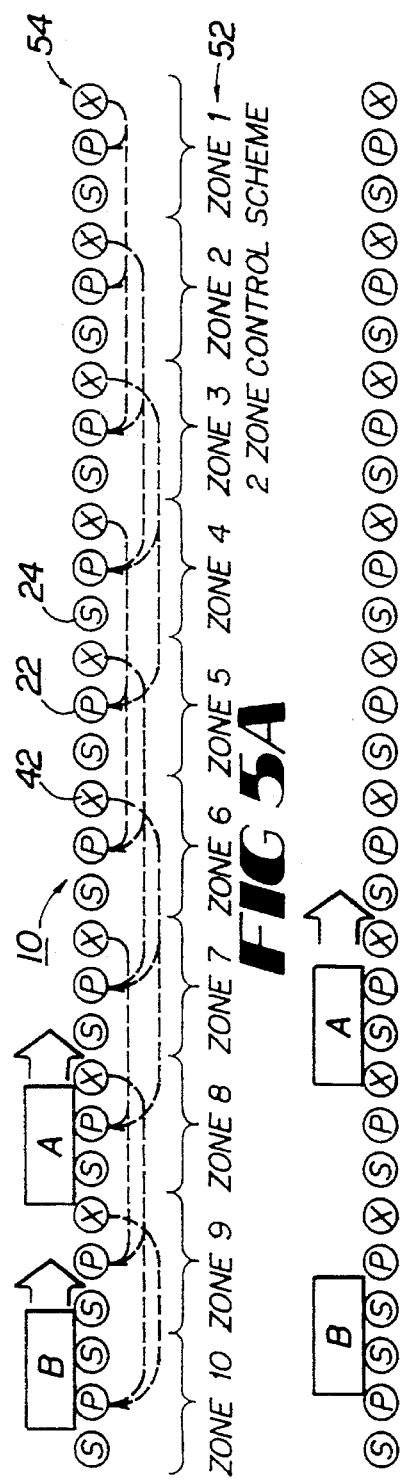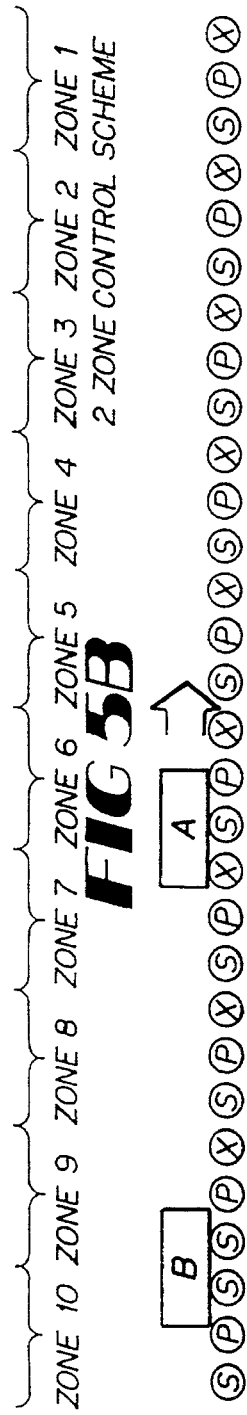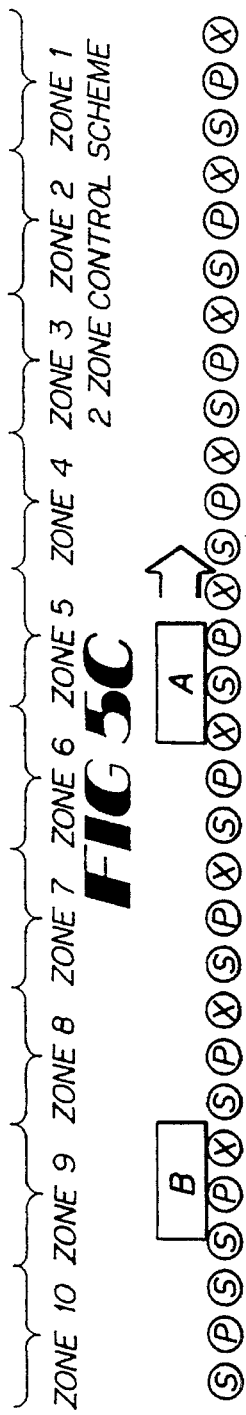
FIG 5A
FIG 5B
FIG 5C
FIG 5D

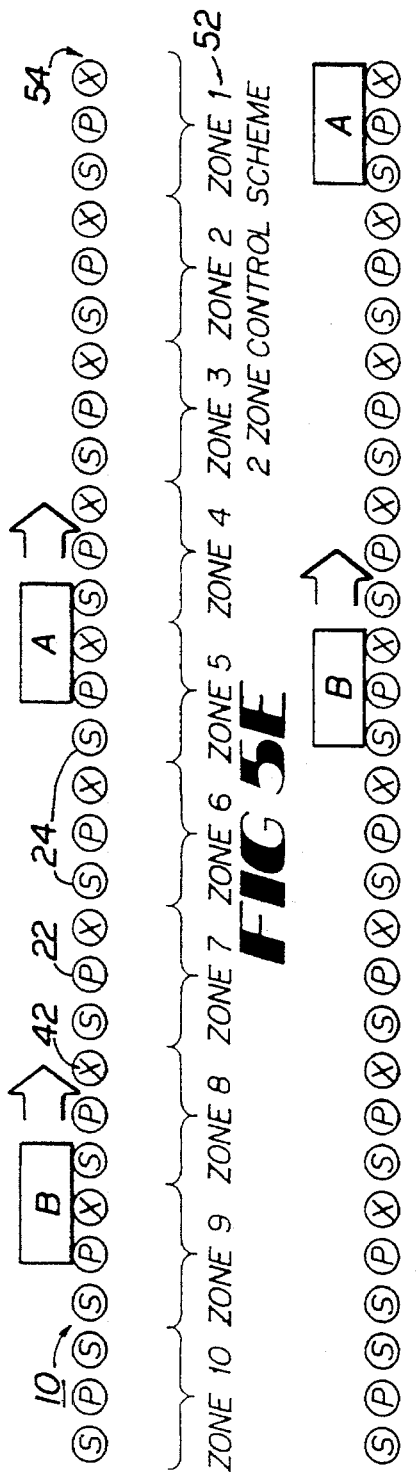
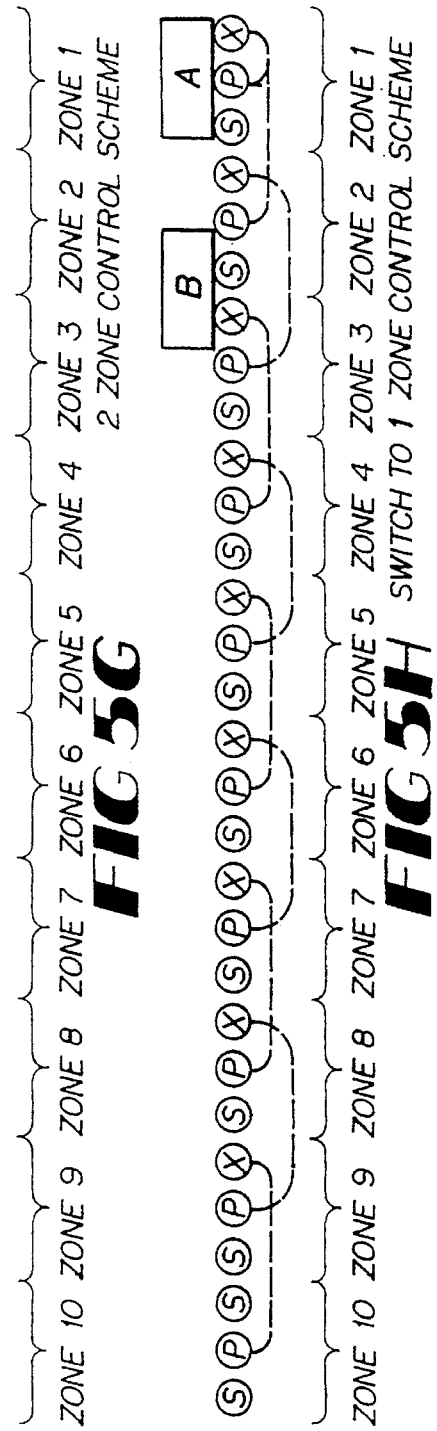

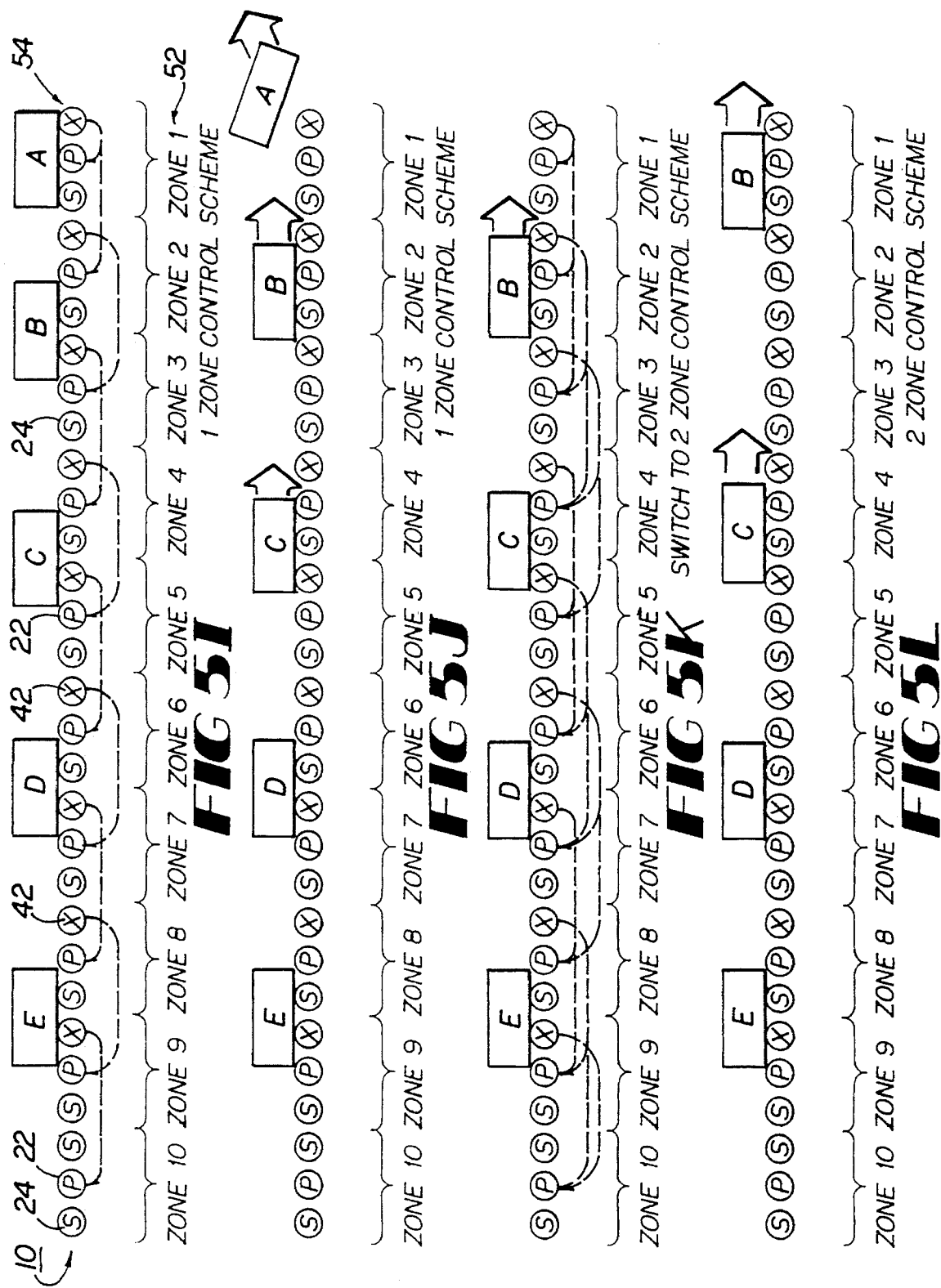

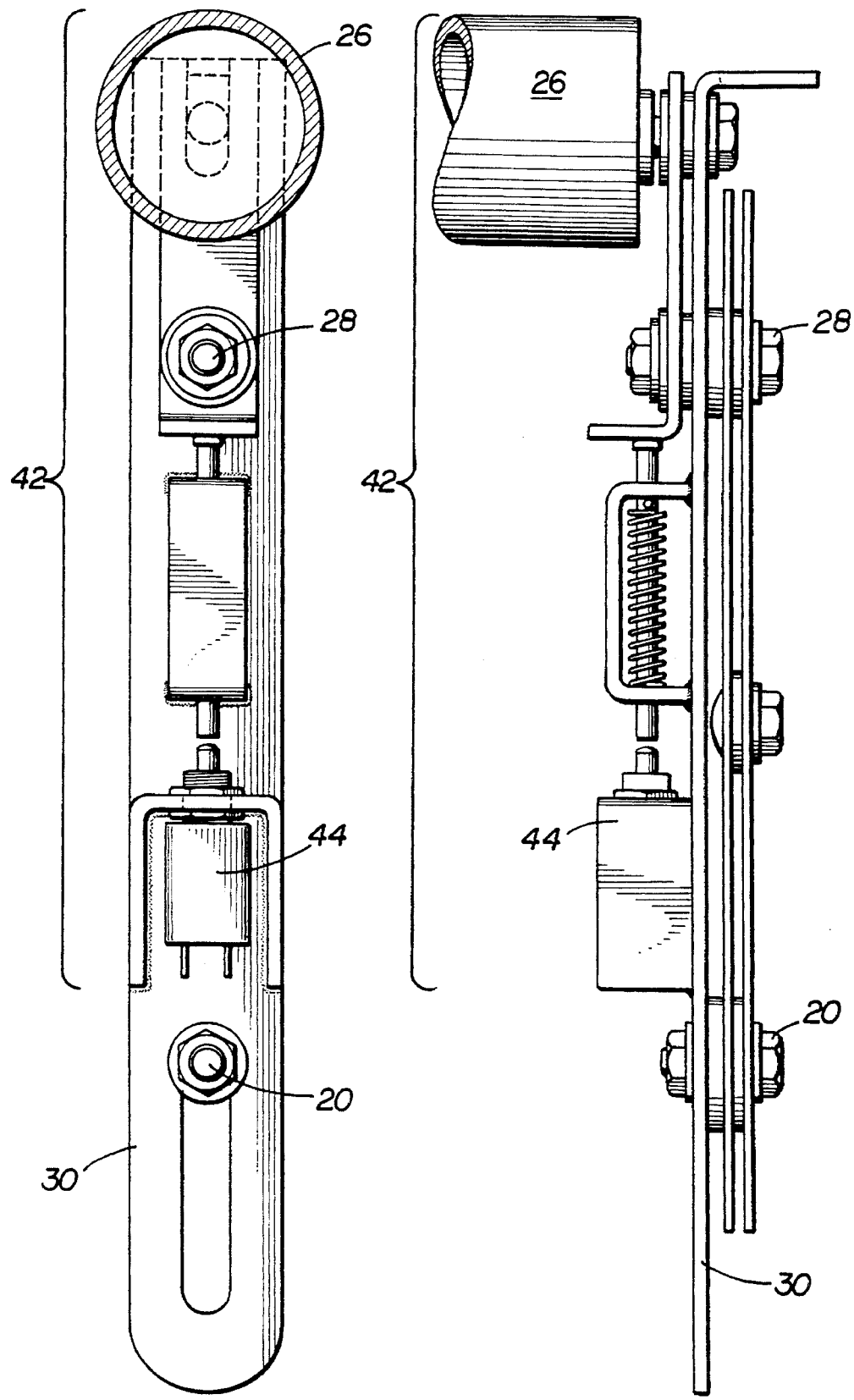

CONTROLLABLY POWERED ROLLER CONVEYORS

This is a continuation of application(s) Ser. No. 08/022,012, filed on Feb. 24, 1993, now abandoned.

This invention relates to conveyors which feature controllably powered rollers to propel and optimize flow of objects being conveyed.

BACKGROUND OF THE INVENTION

Facilities such as warehouses, distribution facilities and parcel and document delivery depots process an ever increasing flow of packages, products and other items (hereinafter, for convenience, "objects") daily. Such facilities frequently utilize a system of automated, fixed conveyors to route and deliver simultaneously objects from storage space or processing containers to trucks, airplanes, or containers, each of which corresponds to a different address or destination. It is not unusual for regional warehouses of large mail order merchandising companies, for instance, to have fifty or more tractor trailers parked at their loading docks simultaneously receiving objects from the automated conveyor system.

Objects travelling on these facility conveyor systems are typically being tracked by a system of optical or mechanical sensors and automated equipment. Although such conveyor systems may be arranged and operated in virtually any number of ways, such equipment generally tracks each object as it progresses along an arterial conveyor which handles all or a substantial quantity of the objects. The equipment then generally shunts each object off of the arterial conveyor, when it has reached an appropriate location, onto a branch or spur conveyor which corresponds to a truck, airplane or container (hereinafter, for convenience, "container").

In many applications, the arterial and spur conveyors deliver objects at a constant velocity, and with no interruption, directly into the interior of the container. Workers must then remove the objects, turn, load them and repeat the motion until a location in the container is filled. They then must extend or retract the conveyor and perhaps swing it in order to fill a new location, while still dealing with the flow of objects. Workers unloading such conveyors are accordingly subject to the constant strain of offloading an uninterrupted flow of objects, and the accompanying stress caused by feeling that they have no control over that flow.

The environment inside such facilities is, furthermore, typically inconducive to the welfare of finely tuned conveyor equipment, and spur conveyors consequently usually feature heavy duty structure such as I beam or C beam longitudinal members which can withstand, for instance, an inadvertent fork lift collision, and roller supporting structure which can withstand the constant abuse of objects being dropped on them. Such robust structures tend, however, to be heavy and thus difficult to extend, retract or otherwise reposition without straining the workers.

Recent increased attention to ergonomics and worker welfare under other rubrics (and consequent control of health care costs) have created economic incentives for facilities to employ spur conveyors that reduce the stress and strain on workers using them. Among other measures, conveyors using lazy tong structures have been employed. These are easily expandable and retractable, and may be twisted and curved into position without adversely affecting flow of objects. Surprisingly, their mechanical flexibility lends great durability and strength for the taxing physical environment, like a willow in the wind.

Lazy tongs are structures formed of a set of parallel bars, each of which is connected in pivoting fashion at its end points and, in some cases, at its midpoint, to corresponding bars in a transversely oriented set of parallel bars so that the structure may be extended and retracted with scissor-like action. Such structures are disclosed in, for instance, U.S. Pat. No. 5,147,025 to Flippo and U.S. Pat. No. 4,852,712 to Best which disclose lazy tong conveyors, powered and unpowered, respectively, and which are incorporated herein by this reference. The Best patent discloses non-powered flexible, expandable conveyors, while the Flippo patent discloses powered conveyors that employ belting or chain to actuate rollers.

Lazy tong roller conveyors as disclosed in the Best and Flippo patents are particularly useful to move objects from one point to other points in a plant or warehouse, and in loading or unloading containers. They may be flexed and extended or retracted with minimum effort to accommodate the desired location, vehicle or container. The nature of the lazy tong structure also allows such conveyors to be retracted and stored in a compact fashion in which successive rollers are positioned nested together immediately adjacent to one another.

The Flippo patent discloses lazy tong flexible and expandable roll conveyors which use drive belting or chain interlaced over rollers on the conveyor surface to propel articles along the conveyor surface. As the conveyor is expanded or retracted, the interlaced belts retain approximately their same length and are thus able to actuate the drive rollers on the top surface and convey objects at any desired conveyor length or curve.

Lazy tong conveyors thus are gaining popularity for use as the final portion of spur conveyors; their flexibility and light weight allows them to perform optimally in transitioning objects from the end of a fixed spur conveyor to an ever changing location in a container, with minimal stress and strain on workers. Their resilient structure lends durability not found in heavier, more rigid previous structures such as I beam conveyors on casters.

Chain driven conveyors, such as the ones disclosed in the Flippo patent, operate effectively in many ways when employed to transition the flow of objects from a constant velocity facility conveyor system to workers offloading objects into a container. However, when such workers get behind in offloading or otherwise interrupt the offloading process, they have no option but to shut down the entire chain driven transition conveyor and thus cause accumulation of objects on the branch portion of the facility conveyor system. In short, such a chain driven conveyor is conceptually simply part of or an extension of the constant velocity conveyor system and it allows no flexibility in order to accommodate the intermittent nature of the manual offloading process.

SUMMARY OF THE INVENTION

Conveyors of the present invention feature power rollers in zones which contain or are connected to independently controllable motors or other power means; each power roller zone has its own motor or motors, whose operation and speed may be controlled independently of other zones of other power rollers. In one embodiment, for instance, the motors are electrical motors found within the rollers. Such internally powered rollers can be AC or DC powered, and are provided, for instance, by the Interroll Corporation of 3000 Corporate Drive, Wilmington, N.C. 28405 under model name Drive Roll 8211R06 D09, for instance. Such rollers are also provided by a company known as Somphy. In another embodiment, the motor or motors may be located externally of the power rollers and connected or coupled by gears, belts or as otherwise desired to one or more power rollers.

Zones of power rollers may be controlled by a control mechanism which includes, for instance, one or more sensors located downstream on the conveyor which, when it senses an object, interrupts or otherwise controls power to the zone in order to cause objects being propelled by the zone to stop, slow down, speed up, or otherwise move differently. Sensors and automated equipment upstream of the conveyor may also be utilized (as may be downstream sensors) in order to allow the zones of rollers to integrate its object flow with flow of objects upstream and downstream. The operation of sensors and zones of power rollers may be automated for optimal object flow, using conventional computer equipment and programming techniques.

Such conveyors may thus operate as an object accumulator in order to smooth the transition between a constant velocity spur conveyor flow of objects and intermittent manual offloading of the objects into a container. Conveyors for this purpose may be formed of a succession of independently (if desired) controllable zones as described above. For instance, the end of such a conveyor may contain a sensor which detects an object sitting at the end of the conveyor because a worker is presently unable or unwilling to offload it, for whatever reason. That sensor can deactivate a zone upstream on the conveyor, causing the next object upstream to stop. Objects upstream of that object continue to flow until the second object actuates a sensor which controls yet another upstream zone to stop the flow of the third object. This process continues. Even though no objects are being offloaded for the moment, the conveyor continues to absorb objects from the constant velocity spur conveyor and accumulate them along its length.

This ability to accumulate objects thus adds a new level of ergonomic advantages to the first step of using lazy tong conveyors rather than rigid ones to load containers. Workers suffer far less stress when freed of the unending physical and psychological stress of an uninterrupted flow of packages which they have no alternative but to lift, turn, place.

The inventors have also found that the removal of the mechanical complexities of the chain driven conveyor more than compensate for present added expense of the power rollers. Elimination of those complexities also manifestly increases reliability and decreases repair time of these conveyors.

The inventors have also found, to their happiness, that these zone-independently powered conveyors are very quiet in operation and thus conducive to effective communications between those unloading the conveyors, often in cramped environments such as the interiors of trucks or containers.

It is therefore an object of the present invention to provide conveyors featuring independently controllable zones of power rollers to optimize flow of objects on the conveyors.

It is another object of the present invention to provide expandable, flexible conveyors featuring independently controllable zones of power rollers which can be used effectively to transition objects between essentially constant velocity plant or warehouse conveyor systems and manual offloading operations.

It is a further object of the present invention to provide expandable, flexible conveyors which serve to accumulate objects being conveyed in order to maximize the flow of those objects.

It is a further object of the present invention to provide expandable, flexible powered conveyors which are mechanically simple, easy to repair and durable.

It is a further object of the present invention to provide expandable, flexible powered conveyors which operate quietly.

It is a further object of the present invention to provide expandable, flexible powered conveyors which lend ergonomic benefits to workers offloading them by, among other things, freeing them of the stress and strain of continually dealing with an uninterrupted flow of objects with no option just to stop working momentarily.

Other objects, features and advantages of the present invention will become apparent with preference to the remainder of this document.

BRIEF DESCRIPTION OF THE DRAWINGS

FIGS. 4A–H are a succession of schematic side views of the conveyor of FIG. 1 showing object flow in a single zone control mode.

FIGS. 5A–L are a succession of schematic side views of another embodiment of conveyors according to the present invention operating in a two-zone control mode while objects are being offloaded, switching to a single zone control mode when offloading stops in order to accumulate objects more tightly, and then switching back to a two-zone control mode as offloading resumes in order to expand the space between objects and thus allow accumulation to begin once again if and when it becomes necessary.

FIG. 7 is a front elevational view of one form of mechanical sensor according to the present invention.

FIG. 8 is a side elevational view of the sensor of FIG. 7.

DETAILED DESCRIPTION OF THE DRAWINGS

Figure 1:
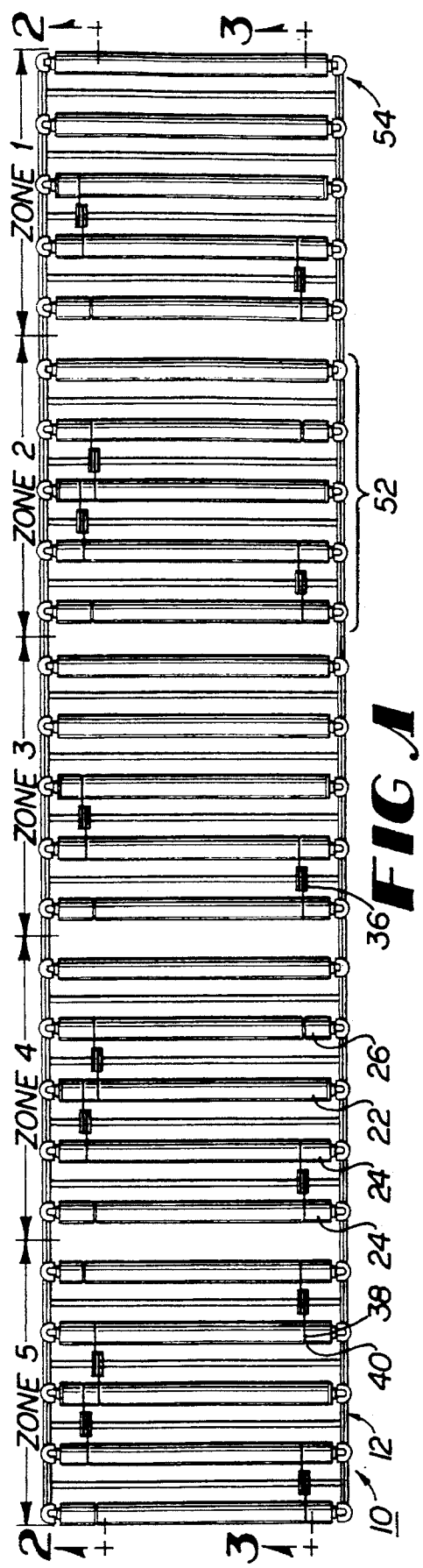
FIG. 1 is a top plan view of a first embodiment of a conveyor according to the present invention.

FIG. 1 shows a top plan view of a conveyor 10 according to the present invention. Conveyor 10 shown in FIG. 1 is expandable and flexible by virtue of being formed of two or more lazy tong structures 12, but conveyors of the present invention may just as easily be made, for suitable applications, using non-lazy tong structures such as, for instance, I beams or C beams as longitudinal strength members.

Each lazy tong structure 12 is formed of two sets of parallel oriented bars 14, the top of each bar in the first set of bars 16 being connected in pivoting fashion to the top of a bar in a second set 18, the bottom of each bar in the first set 16 being connected in pivoting fashion to the bottom of a bar in the second set 18. The bottom pivotal connections 20 are preferably formed of nuts and bolts, but may be rivets or any other desired fasteners. A first variety of lazy tong structure 12 requires that the midpoints of each bar in the first set 16 be connected in pivoting fashion to the midpoint of a bar in the second set 18, but the lazy tong structures 12 need not include the middle connection.

The conveyors may be supported with a plurality of legs which may be connected to a top pivotal connection and slidably connected to a bottom pivotal connection as described in the Flippo patent mentioned above, or as otherwise desired and as conventionally employed for lazy tong or non-lazy tong structures. The legs may be attached to casters or other rollers, which may, but need not, contain braking mechanisms as disclosed in that patent.

Figure 2:
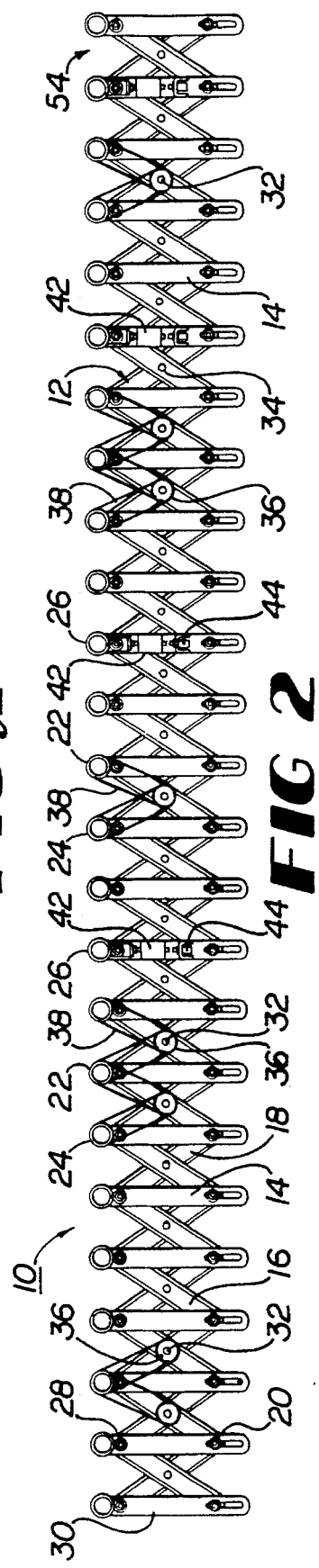
FIG. 2 is a side, cross-sectional view of the conveyor of FIG. 1.
Figure 3:
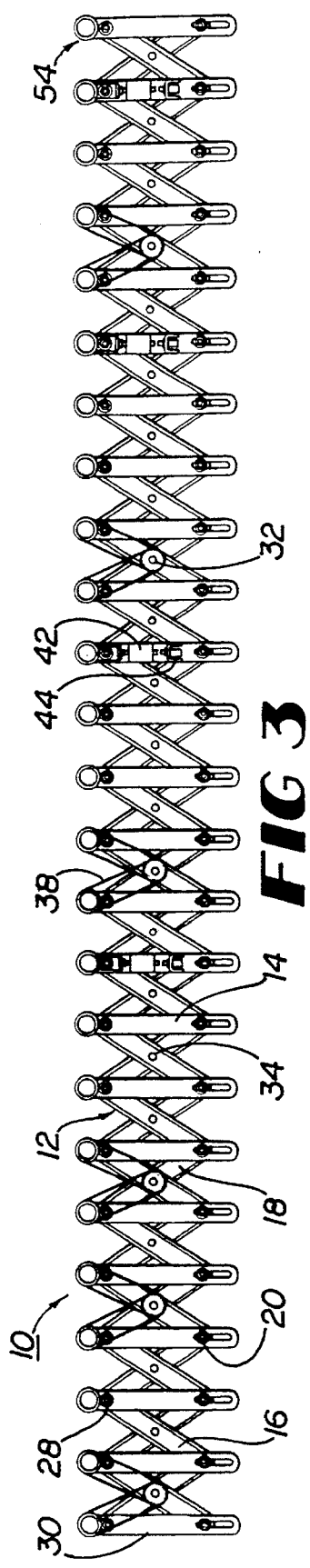
FIG. 3 is an opposite side, cross-sectional view of the conveyor of FIG. 1.
Figure 6:
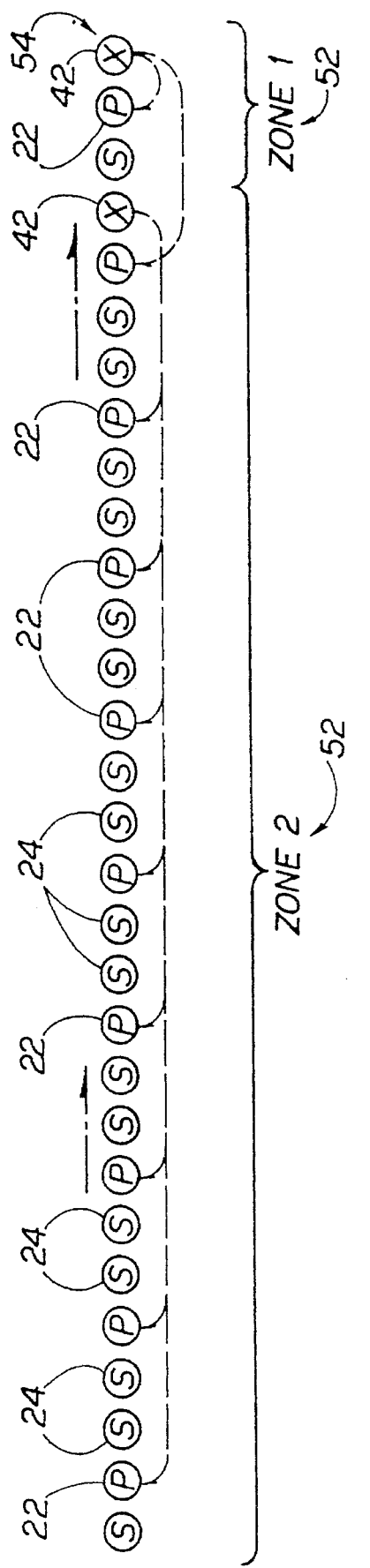
FIG. 6 is a schematic side elevational view of another conveyor according to the present invention featuring another control mode.
Figure 9:
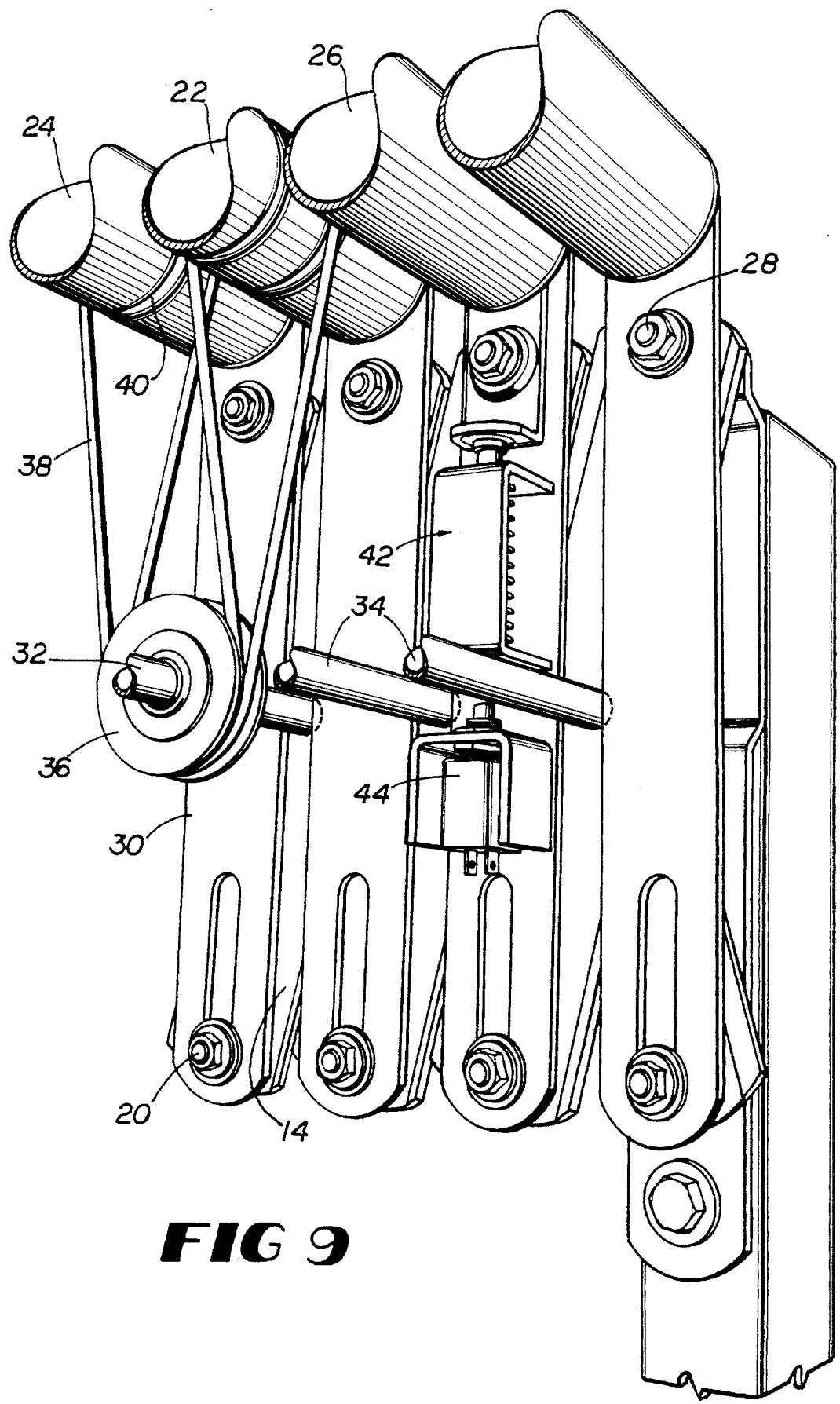
FIG. 9 is a perspective view of portions of the conveyor of FIG. 1, showing a mechanical sensor and drive means which drives slave rollers.

Spanning the lazy tong structures 12 in the embodiment shown in FIGS. 1–3 are a plurality of rollers. Rollers in those drawings include power rollers 22 which contain a motor or motors or other mode of means. As mentioned above, however, power rollers may, instead of containing a motor, be connected to or share an external motor or motors. The conveyors may also, as shown in FIG. 1, contain slave rollers 24 which are powered by power rollers 22 and idler rollers 26 which are not actuated by mode of means within the conveyor 10.

In the embodiment shown in FIGS. 1–3, each roller is connected to a top pivotal connection 28 in a lazy tong structure 12 (which may be, as in the bottom pivotal connections 20, nuts and bolts or other fasteners) via a support clip 30 that allows the roller to extend above the surface of the conveyor 10 in order, among other things, to increase compactness during nesting. Top pivotal connections 28 may just as easily be formed by portions of axles on rollers extending through the connections 28. Each clip 30 (if used) may be connected in pivoting fashion as shown in FIGS. 2 and 3 to a top pivotal connection 28 and in sliding fashion to corresponding bottom pivotal connection 20 in order to constrain its roller as it receives loads on the conveyor. Clips 30 add robustness to the conveyor, but certainly are not necessary for attaching rollers to lazy tong structures 12.

As shown in FIGS. 1–3, where slave rollers 24 are used to receive power from power rollers 22 in order to provide additional motive contact with objects being conveyed on the conveyor 10, intermediate axles 32 may be employed, such as by positioning between midpoints 34 of first sets of bars 16 and second sets of bars 18 to receive, in rotating fashion, power transfer pulleys 36. Intermediate axles 32 may form a portion of midpoint connections 34, or may be attached to them via clips (not shown) or as otherwise desired.

A polyurethane or other suitable belt 38 may ride a groove 40 in power roller 22 and in a power transfer pulley 36, as shown in FIGS. 1–3 and 9. Another belt 38 rides grooves 40 in a slave roller and to the power transfer pulley to transfer power from the power roller to power roller 22 to a slave roller 24. As shown in FIG. 1, the intermediate axle 32/power transfer pulley 36/belt and groove arrangement also is used to transfer power between two slave rollers 24. This belt and pulley drive arrangement, as perhaps best shown in FIGS. 2, 3 and 9, accommodates contraction and expansion of the lazy tong structures 12 without loss of effectiveness in power transfer, because the length of the path through which power is transferred by the belts remains constant regardless of the geometry of the lazy tong structures 12 and the distance between rollers. A more detailed illustration of this arrangement is shown in perspective in FIG. 9.

Conveyors 10 according to the present invention need not, however, contain any slave rollers 24 at all, as they need not contain any idler rollers 26 at all, either. Accordingly, there is no requirement that conveyors according to the present invention contain any belt and pulley or other type of power transfer arrangement between rollers. For instance, the rollers may be exclusively power rollers 22, or the conveyor 10 may include only power rollers 22 and idler rollers 26 and power rollers 22 and slave rollers 24.

Figure 10:
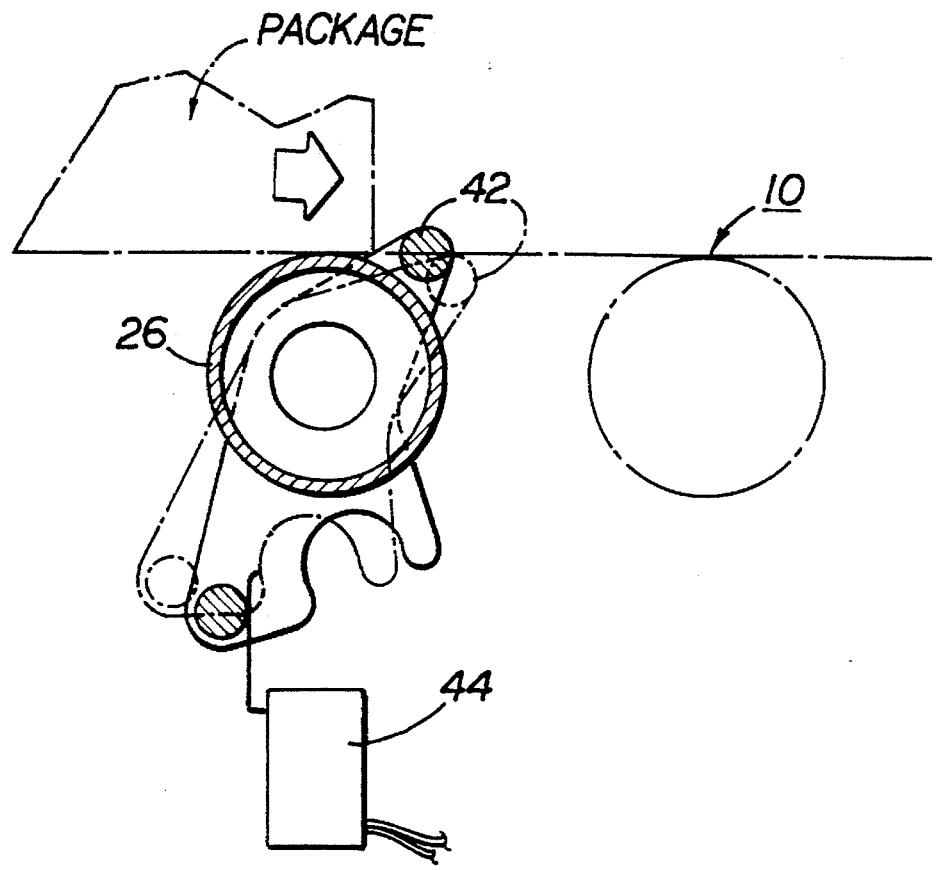
FIG. 10 is a schematic view of another mechanical sensor according to the present invention.
Figure 11:
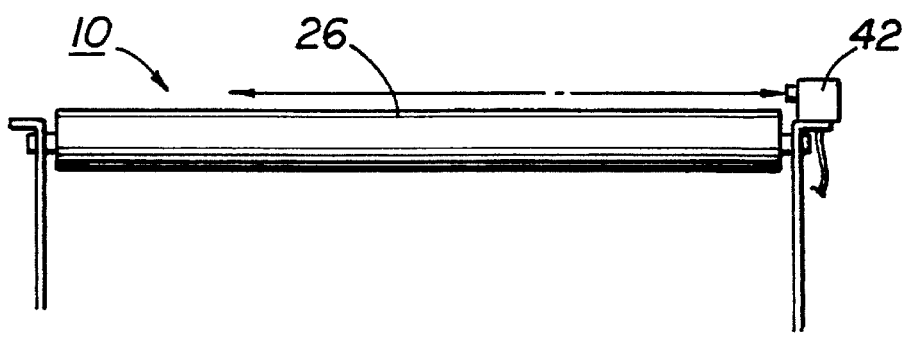
FIG. 11 is a schematic view of an optical sensor according to the present invention.

As also shown in FIG. 1, conveyor 10 contains one or more sensors 42 for sensing presence of objects or items on the conveyor 10 in order to control actuation of zones 52 of power rollers 22. Sensors 42 may be a mechanical switch 44 which is shown in FIGS. 2, 3, 7 and 8 and which is mechanically actuated by the weight of an object on a roller connected to the switch 44. It may also be a trip bar 46 which activates a switch such as a leaf or feather switch or other appropriate switch 48 as shown in FIG. 10, or an optical sensor 50 such as a photocell or infrared device as shown in FIG. 11. Other sensors, such as load cells or timing logic in computer equipment may also serve as sensors 42.

Figure 12:
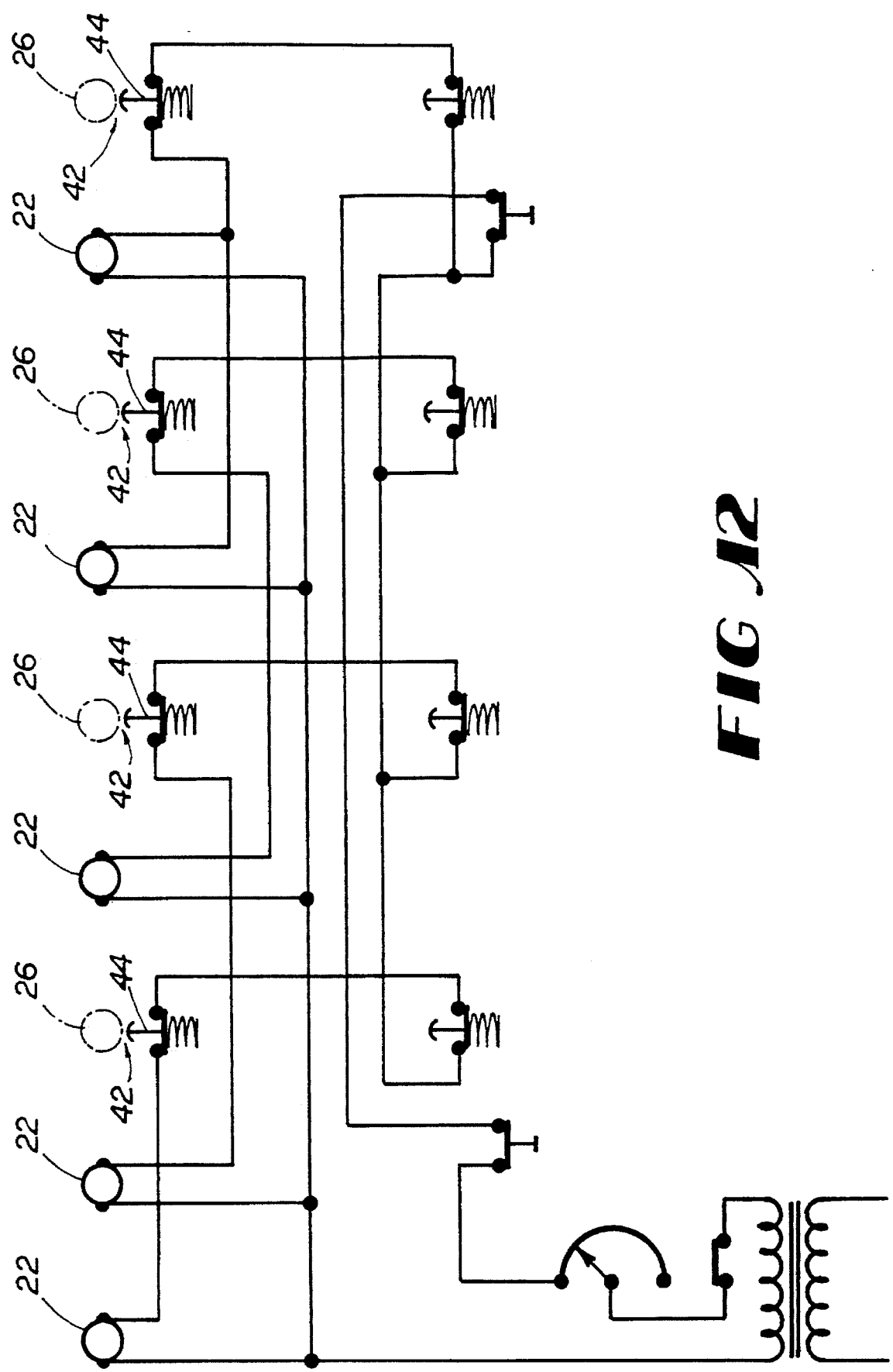
FIG. 12 is a wiring diagram for the conveyor of FIG. 1.

Power rollers 22 according to the present invention are arranged in a number of zones 52. A zone 52 may contain one power roller 22 or it may contain more than one power roller 22. A zone 52 is, for conceptual purposes of this document, a unit of rollers which is independently controllable. Without constraining the scope of the invention, a zone 52 of the embodiment shown in FIG. 1 contains a power roller 22 connected by belts 38 to two upstream slave rollers 24 and a downstream slave roller 24, together with an additional idler roller 26 which rides a mechanical switch 44 at either end. A hardwired control scheme or mode for the zones 52 of the conveyor 10 of FIG. 1 is shown in FIG. 12. There, the sensors found in a particular zone 52 control actuation of the single prior upstream zone 52 (with the exception of the sensors in the offload in zone 1, which control zone 1 and the adjacent upstream zone). Accordingly, if an object is sitting on idler roller 26 of zone 1, power rollers 22 in zone 1 and zone 2 stop so that objects do not simply roll off the end of conveyor 10. Objects upstream continue progressing down the conveyor until they reach the stopped zone 2. At this time, the first such object sits atop idler roller 26 in zone 3 to deactivate zone 4. Upstream objects continue along the conveyor until they reach zone 4, at which time an object sits atop idler roller 26 that actuates mechanical switch 44 in zone 5 to deactivate zone 6. The conveyor 10 continues to accumulate objects in this fashion as they leave a constant velocity spur conveyor (not shown).

This accumulation operation is shown schematically in greater detail in FIGS. 4A–H, which illustrate the control scheme of the conveyor of FIG. 1. FIGS. 4A–H show a situation in which successions of closely packed objects are being conveyed off of a constant velocity spur conveyor adjacent to zone 5, along conveyor 10 toward the offload end 54 of conveyor 10 where manual offloading is occurring. Objects A, B, C and D proceed down conveyor 10, because none of those objects have actuated a sensor 42 controlling a zone 52 in which another object is located. As shown in FIG. 4B, however, object A reaches sensor 42 located in zone 1 which deactivates zone 1 and zone 2 to stop object A in zone 1 and B in zone 2. Objects C and D continue down the conveyor because their zones 52 have not been deactivated by downstream sensor 42. However, as shown in FIG. 4C, object C reaches zone 3 which has been deactivated by object B tripping sensor 42 in zone 2. Object C therefore stops atop the sensor 42 in zone 4 and, in turn, deactivates zone 5 which stops object D. All four objects are now stopped and accumulated on the conveyor.

Object A is offloaded as shown in FIG. 4D to release sensor 42 in zone 1 and thus reactivate zones 1 and 2 to start object B. Object B, as shown in FIGS. 4D and 4E progresses down conveyor 10 ultimately moving past sensor 42 in zone 2 to reactivate zone 3 so that object C begins to move. Object B is offloaded as shown in FIG. 4F, and object C clears sensor 42 in zone 4 to reactivate zone 5 and therefore move object D. However, as shown in FIG. 4G, object C trips sensor 42 in zone 3 to stop zone 4 and thus object D. Object D stops until object C clears sensor 42 in zone 3, thus increasing the space between C and D on the conveyor. The inventors have found that, according to this control scheme, the objects tend to be spaced at a distance of the sum of the length of the first object, the zone in which the sensor appears, and the controlled zone, as shown in FIG. 4H, when the conveyor has "unaccumulated."

More than one zone 52 may be controlled by a sensor 42. Additionally, more than one sensor 42 may control a zone 52. Conveyors 10 may also be arranged to cause control schemes to change according to the state of object flow on the conveyors 10. For instance, a sensor may control a plurality of zones while objects are flowing, but only control one zone as objects begin to accumulate in order to cause more compact accumulation and therefore more absorption of objects from a constant velocity spur conveyor feeding conveyor 10. FIGS. 5A–L show a conveyor in which zone control modes change depending on status of object flow on the conveyor 10. The conveyor shown in FIG. 5A operates sometimes according to a two-zone control scheme in which a sensor 42 controls two adjacent upstream zones 52. Thus, sensor 42 in zone 1 controls, in the two-zone control mode, power rollers 22 in zones 2 and 3. Likewise, sensor 42 in zone 2 controls power rollers 22 in zones 3 and 4 and so on. Sensors 42 may, it should be noted, control not only actuation of, but also angular velocity of power rollers 22, if desired (although that is not the case with the conveyor shown in FIG. 5).

Consider two objects A and B deposited on conveyor 10 as shown in FIG. 5A by an upstream conveyor. As object A progresses down conveyor 10, it reaches sensor 42 in zone 8, as shown in FIGS. 5A and B, to stop object B while object A passes sensor 42. FIG. 5C shows object A continuing between sensor 42 in zone 8 and sensor 42 in zone 7 which allows object B to move slightly before object A reaches sensor 42 in zone 6 to deactivate zone 7 and zone 8 as shown in FIG. 5D. The spacing between objects A and B in this flow status thus is approximately three zones, or the sum of the lengths of the zone in which the activated sensor 42 occurs together with the two zones that sensor controls together with the length of the first object. This spacing correlates to the spacing of object flow in the arrangement shown in FIGS. 4, in which the spacing during flow status reaches a steady state of approximately two zones plus first object length as described there, corresponding to the zone in which the activated sensor 42 occurs, together with the zone that sensor 42 activates plus the object length.

Objects A and B progress down the conveyor after they reach the steady state spacing, until object A reaches the end of the line and causes conveyor 10 to begin accumulating objects. As shown in FIG. 5F, object A is stopped on the sensor 42 in zone 1 and object B continues to progress. Object B stops when it reaches zone 3, one of the two zones activated by sensor 42 in zone 1, as shown in FIG. 5G. The succeeding object would similarly stop in zone 7, since object B activates sensor 42 in zone 4 which deactivates zones 5 and 6. The spacing of accumulated objects would accordingly be approximately three zones, or the length of sensor zone plus controlled zones, from leading edge to leading edge of objects A and B.

However, conveyor 10 may shift modes in order to accumulate objects more efficiently, as shown in FIG. 5H. Conveyor 10 shifts to a one zone control mode in which a sensor 42 only controls a single zone 52, the one preceding it. Accordingly, zone 3 reactivates and object B progresses to zone 2 as shown in FIG. 5H. Succeeding objects, in the one zone control mode for object accumulation, are fed onto conveyor 10 as shown in FIG. 5I. Object C progresses down conveyor 10 until it reaches zone 4, which has been deactivated by sensor 42 in zone 3 which was in turn tripped by object B. Object C in turn trips sensor 42 in zone 5 to deactivate zone 6 which stops object D for a stopped spacing of approximately two zones (one sensor zone plus controlled zone), leading edge to leading edge.

Object A is offloaded from conveyor 10 as shown in FIG. 5J so that the conveyor 10 begins "deaccumulating." Sensor 42 in zone 1 is released and zone 2 which it controls begins moving object B. Object B in turn moves off of sensor 42 in zone 3 to reactivate zone 4 which begins moving object C. This chain of events would continue in this fashion as flow once again tends to a steady state.

However, as shown in FIG. 5K, the conveyor 10 may switch into a "deaccumulation" mode once again in which a sensor controls two upstream zones as in FIGS. 5A–G. Object C thus stops in zone 4 which is deactivated by sensor 42 in zone 2, as shown in FIG. 5K. FIG. 5K illustrates object B clearing sensor 42 in zone 2 at which point object C begins to move in zone 4 controlled by that sensor. Steady state flow spacing becomes, once again, approximately three zones (sensor zone, two control zones and length of object on sensor) as flow reaches steady state.

Figure 13:
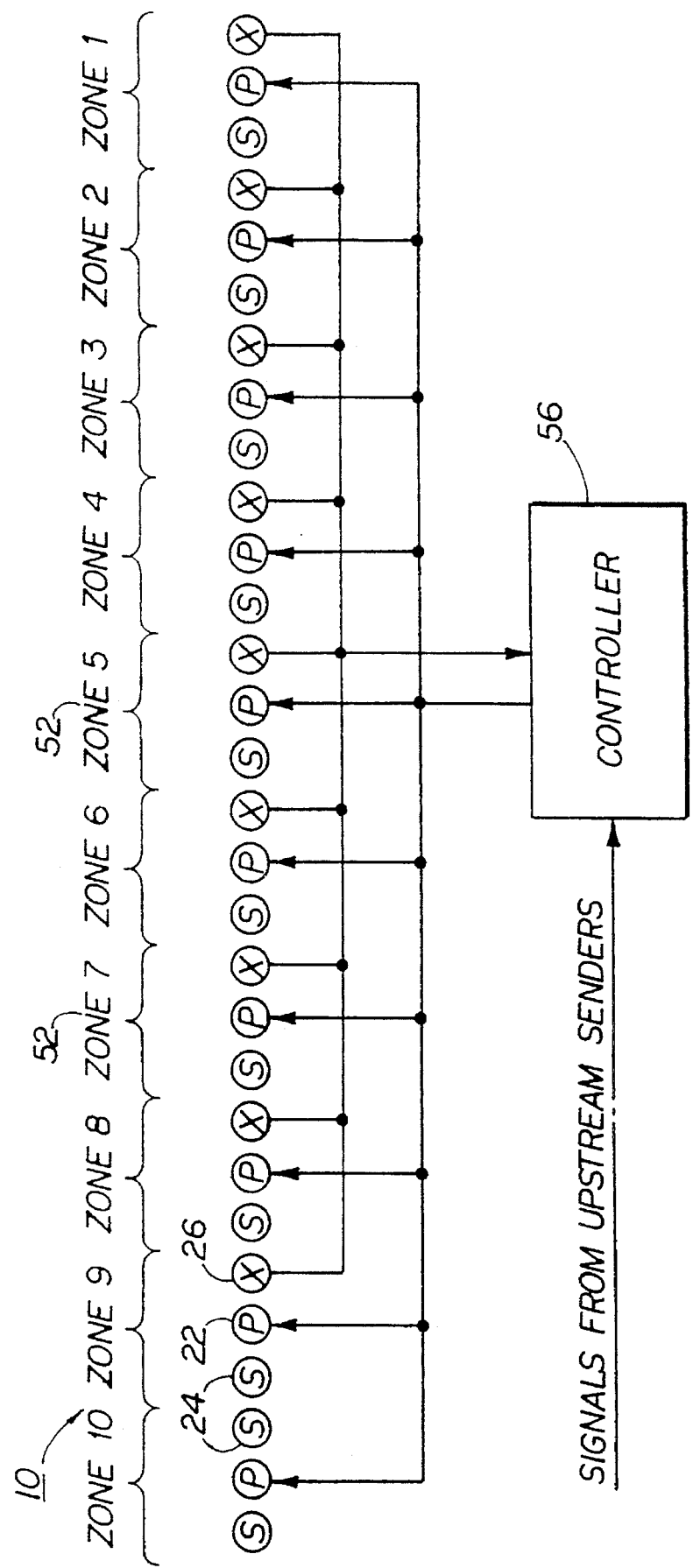
FIG. 13 is a schematic diagram of a microprocessor controlled conveyor according to the present invention.

Sensors 42 may be positioned as desired, along the length of conveyor 10, on the ceiling televising conveyor 10, or as otherwise desired to control the flow of packaging on conveyor 10. A particular sensor may, in some senses as shown above, control actuation and/or speed of one zone, more than zone, or any combination of zones as desired to optimize object flow and accumulation. Similarly, situations may occur in which sensors are decoupled from any zones. Control of zones may occur not only according to sensors 42 sensing positions of objects on conveyor 10, but also from data originating upstream of conveyor 10 which corresponds to, among other things, position, spacing and speed of objects on conveyors upstream of conveyor 10. Thus for instance, a burst of objects upstream of conveyor 10 may create the need to simultaneously increase speed of some or all zones in conveyor 10 in order to accommodate objects and, if desired, to accumulate them or "deaccumulate" them. Similarly, the offload end of conveyor 10 may be the source of information which is useful for controlling zones such as, for instance, when objects have been offloaded consistently for some period of time so that an increase in conveyor speed 10 is beneficial in order to increase productivity of the workers offloading conveyor 10. FIG. 13 shows in schematic form a diagram for computerized control of a conveyor 10 in order to accommodate these types of control schemes.

What is claimed is:

1. A conveyor structure for conveying objects from one location to another, comprising:
   (a) a frame comprising a plurality of lazy tong structures;
   (b) a plurality of roller zones, each zone extending between two lazy tong structures, and comprising a plurality of elongated rollers, at least one of which rollers is a powered roller which is coupled to independent power means; and
   (c) control means for controlling actuation of the roller zones in order to optimize flow of the objects on the conveyor by controlling separation between moving objects and between accumulated objects and comprising at least one sensor which senses the presence of objects on the conveyor and which independently actuates at least one of the zones.

2. A conveyor structure for conveying objects from one location to another, comprising:
   (a) a frame comprising a plurality of lazy tong structures;
   (b) a plurality of roller zones, each extending between two lazy tong structures and each comprising:
      (1) at least one powered elongated roller which is coupled to independent power means;
      (2) at least one non-powered elongated roller;
      (3) at least one drive means which transfers power to a non-powered roller;
   (c) control means for controlling actuation of the roller zones in order to optimize flow of the objects on the conveyor, comprising at least one sensor which senses the presence of objects on the conveyor and which independently actuates at least one of the zones.

3. A conveyor structure according to claim 2 in which at least one of the non-powered rollers is not mechanically coupled to a powered roller.

4. A conveyor structure according to claim 2 in which the control means includes a plurality of sensors, each of which may be selectively coupled to at least one of the roller zones.

5. A conveyor structure according to claim 2 in which each roller zone is coupled to at least one sensor.

6. A conveyor structure according to claim 2 in which each sensor may be coupled to, and control actuation of, more than one roller zone.

7. A conveyor structure according to claim 2 in which each sensor is coupled to a processor means which is coupled to the powered rollers in each roller zone for selectively controlling actuation of the zones.

8. A conveyor structure according to claim 2 in which each sensor comprises a switch that is connected to a mechanical contact element that mechanically contacts at least some of the objects on the conveyor.

9. A conveyor structure according to claim 2 in which each sensor comprises an optical device.

10. A conveyor structure for conveying objects from a first location to a second location, comprising:
    (a) a pair of lazy tong structures;
    (b) a plurality of roller zones, each extending between the lazy tong structures and each including:
       (1) at least one powered roller which contains at least one electric motor;
       (2) at least one non-powered roller;
       (3) at least one axle extending between the lazy tong structures and rotatably carrying at least one pulley;
       (4) drive means connected to the powered roller, the non-powered roller and the pulley;
    (c) control means for selectively controlling actuation of the roller zones in order to optimize flow of the objects on the conveyor, comprising at least one sensor which senses the presence of objects on the conveyor and which independently actuates at least one of the zones.

11. A conveyor according to claim 10 in which each sensor includes a mechanical trip means for contacting at least some of the objects on the conveyor coupled to a switch which is in turn coupled to at least one of the zones.

12. A conveyor according to claim 11 in which each mechanical trip means is connected to a roller which is not located in the roller zone which is actuated by the trip means.

13. A conveyor according to claim 10 in which the end of the conveyor corresponding to the second location contains a sensor which simultaneously controls more than one roller zone.

14. A conveyor according to claim 10 in which the control means contains means for controlling the speed of powered rollers in the roller zones.

15. A conveyor structure according to claim 10 in which separation between objects flowing on the conveyor is controlled by changing the number of rollers in each zone.

16. A conveyor structure according to claim 2 in which the separation between objects flowing on the conveyor is controlled by changing the number of roller zones each sensor actuates.

17. A conveyor structure according to claim 15 in which objects accumulated on the conveyor are maintained a predetermined distance apart by changing the number of rollers in each roller zone.

18. A conveyor structure according to claim 16 in which objects accumulated on the conveyor are maintained a predetermined distance apart by changing the number of roller zones each sensor actuates.

19. An expandable conveyor structure for conveying objects comprising:
    (a) a pair of lazy tong structures;
    (b) a plurality of roller zones, each extending between the lazy tong structures and each including:
       (1) at least one powered roller which contains an electric motor;
       (2) at least one non-powered roller;
       (3) at least one axle extending between the lazy tong structures and rotatably carrying at least one pulley;
       (4) drive means connected to the powered roller, the non-powered roller and the pulley;
       (5) a sensor for sensing the presence of objects within the zone; and
    (c) control means for selectively controlling actuation of the roller zones in order to optimize flow and accumulation of the objects on the conveyor, comprising a processor means for processing information from the sensors corresponding to each roller zone.

\* \* \* \* \*

UNITED STATES PATENT AND TRADEMARK OFFICE
CERTIFICATE OF CORRECTION

PATENT NO. : 5,456,347
DATED : October 10, 1995
INVENTOR(S) : John W. Best; Bobby K. Flippo; Paul W. Irby, all of Jonesboro, Arkansas It is certified that error appears in the above-indentified patent and that said Letters Patent is hereby corrected as shown below:

Column 1, delete lines 4-5, and insert the following:

-- This application is a continuation of application serial no.08/022,012, filed February 24, 1993 and having the same title, which is a continuation-in-part of application serial number 07/893,801 (now U.S. Patent No. 5,224,584), filed June 4, 1992 and entitled "Expandable Powered Conveyors," which is a continuation-in-part of application serial number 07/642,012 (now U.S. Patent No. 5,147,025), filed January 16, 1991 and entitled "Expandable Powered Roller Conveyor." --

Signed and Sealed this

Ninth Day of July, 1996

*Attest:*

BRUCE LEHMAN

*Attesting Officer*     *Commissioner of Patents and Trademarks*